United States Patent [19]
Bunyan

[11] 4,175,311
[45] Nov. 27, 1979

[54] JOINTS

[75] Inventor: Thomas W. Bunyan, London, England

[73] Assignee: Pilgrim Engineering Developments Limited, London, England

[21] Appl. No.: 806,647

[22] Filed: Jun. 15, 1977

[30] Foreign Application Priority Data

Jun. 16, 1976 [GB] United Kingdom ................ 4520/76
Mar. 11, 1977 [GB] United Kingdom ............. 10489/77

[51] Int. Cl.² ............................................. B23P 7/00
[52] U.S. Cl. .............................. 29/402.18; 29/402.19; 29/455 R; 264/35; 264/36; 164/108; 29/235; 29/237; 52/743
[58] Field of Search ................ 29/236, 237, 235, 455, 29/401 A, 401 C, 401 D, 401 E, 401 R, 460, 159 R, 159.3, 402; 317/15, 315; 164/108, 109, 110, 112; 264/277, 262, 275, 251, 261, 36

[56] References Cited
U.S. PATENT DOCUMENTS

| 732,400 | 6/1903 | Dresser et al. ...................... 29/401 |
| 2,313,074 | 3/1943 | Jewell ............................... 264/263 X |
| 2,763,047 | 9/1956 | Laster .................................. 25/127 |
| 3,491,182 | 1/1970 | Hunder et al. ....................... 264/262 |
| 3,892,032 | 7/1975 | Bagnulo ................................. 29/455 |

OTHER PUBLICATIONS

'Araldite', *British Plastics*, vol. 26, No. 295, Dec. 1953, p. 37.

*Primary Examiner*—Francis S. Husar
*Assistant Examiner*—V. K. Rising
*Attorney, Agent, or Firm*—Woodcock, Washburn, Kurtz & Mackiewicz

[57] ABSTRACT

A method of forming a joint between a metal structural tubular member and a metal sleeve. The method comprises placing the sleeve around a part of the tubular member so that there is a space between the sleeve and the adjacent part of the tubular member, closing the ends of at least a part of the space between the tubular member and the sleeve, injecting a hardenable composition into the space between the closed ends and maintaining the pressure until set.

The method can be used for joining together structural tubular members or for repairing a damaged structural member.

6 Claims, 9 Drawing Figures

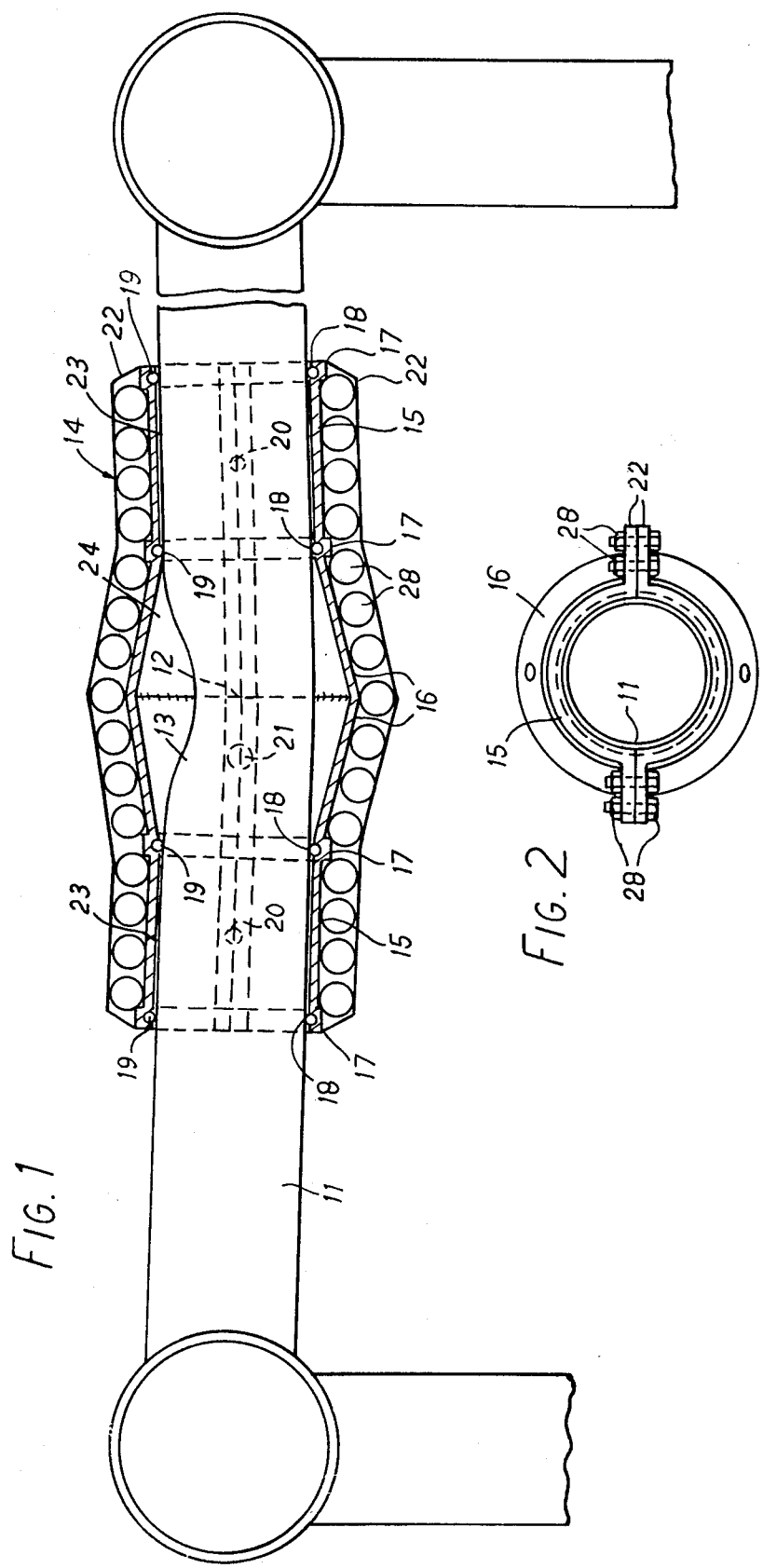

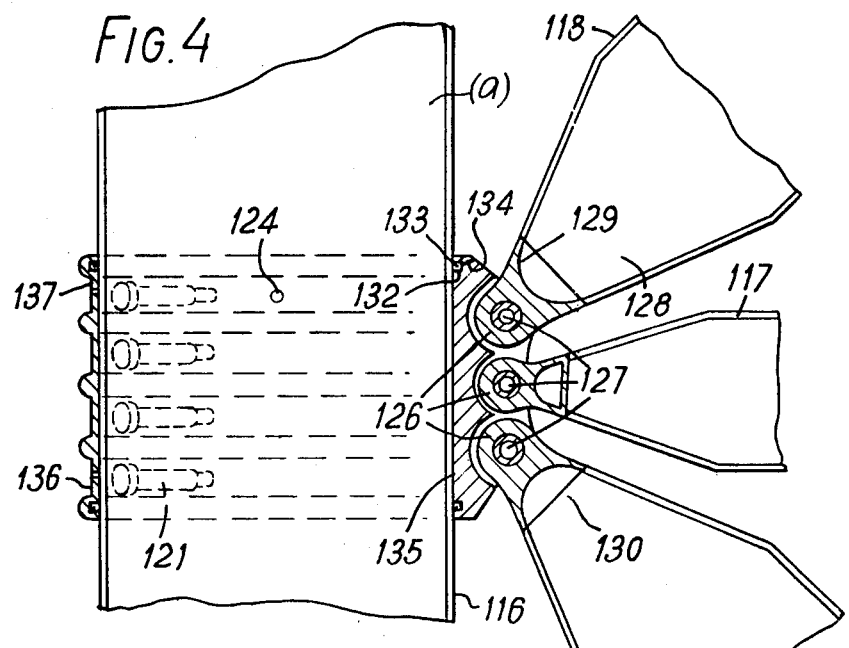
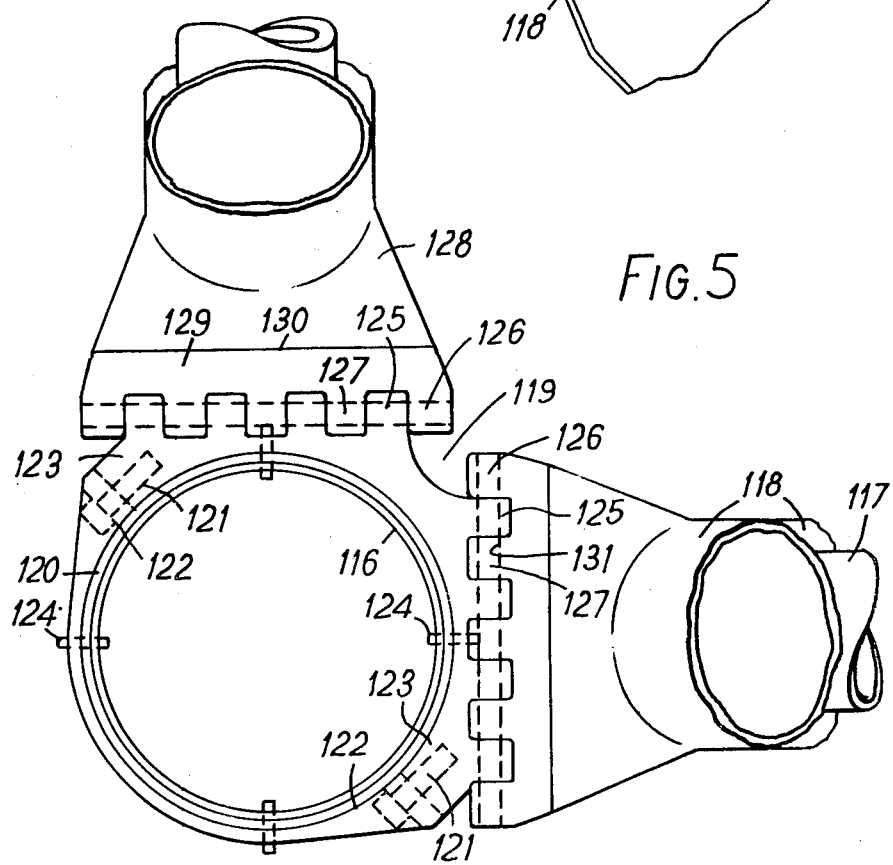

JOINTS

The present invention relates to a method of forming a joint between a structural tubular member and a sleeve.

According to the present invention there is provided a method of forming a joint between a structural tubular member and a sleeve which comprises placing the sleeve around a part of the structural tubular member so that there is a space between the sleeve and the adjacent part of the tubular member, closing the ends of at least a part of the space between the tubular member and the sleeve, injecting a hardenable composition through the wall of the sleeve into the space between the closed ends, and maintaining the composition under pressure until set. Preferably the composition is a high-friction epoxy resin composition such as for example Araldite SW404 which includes carborundum powder in the epoxy resin.

The method may be used for joining together structural tubular members in which case the sleeve may be part of a coupling member, or the joint may be used for repairing a structural member in which case the sleeve may be split diametrically to enable the sleeve to be placed around the damaged structural member.

The invention will now be further described by way of example with reference to the accompanying drawings, of which:

FIG. 1 shows a longitudinal section through a repair joint between a sleeve and a structural tubular member of an oil production platform;

FIG. 2 shows an end elevation of the sleeve of FIG. 1;

FIG. 4 shows a vertical section on an enlarged scale through a joint of the tower of FIG. 3;

FIG. 5 shows a horizontal section through the joint of FIG. 4;

Figure 3:
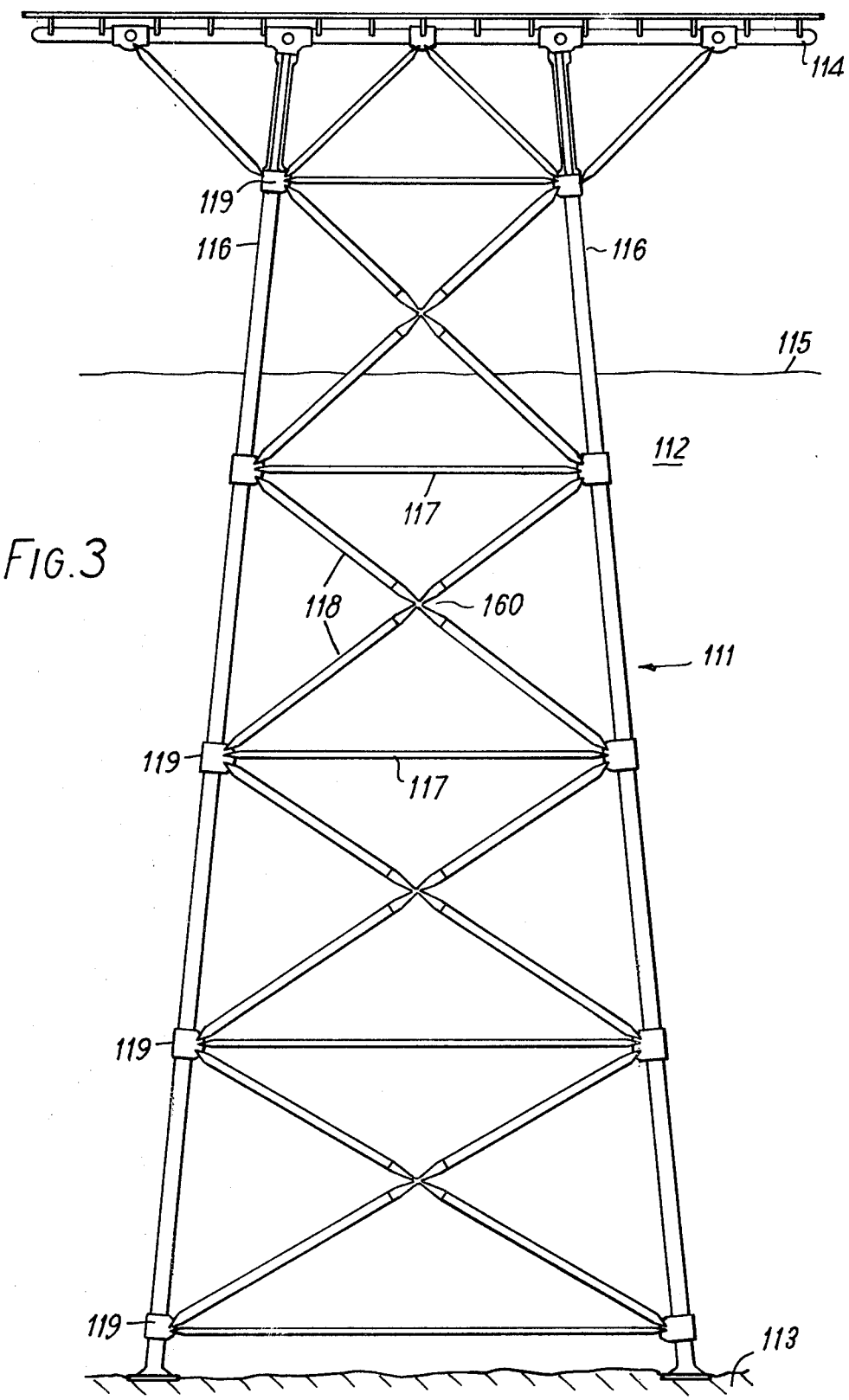
FIG. 3 shows an offshore structure including a tower supporting the framework of a drilling platform and constructed using the joint of the present invention.

Referring to FIGS. 1 and 2 of the drawings, these show a joint according to the invention as applied to the permanent repairing of a structural member 11 of an underwater part of an oil production platform. The structural member 11 has been damaged with a bend 12 and a buckle 13. A steel sleeve 14 is placed around the damaged part of the structural member 11 and secured to the member to reinforce the damaged part.

The sleeve 14 comprises two cylindrical sections 15 which are located on each side of the damaged part of the tubular member and a flared central part of a size great enough to span the damaged part formed by two frusto-conical sections 16 with their ends of larger diameter joined together and their ends of smaller diameter joined to the inner ends of the respective cylindrical sections 15. At each end of each cylindrical section 15 is a flange ring 17 which has a groove 18 on its inner side to accommodate a hollow nitrile rubber tire 19. The flange rings, cylindrical sections and conical sections are secured together by welding. Insulated electrical heating tape (not shown) is wound on the inside of the cylindrical sections.

Each nitrile rubber tire 19 has a filling pipe and an exhaust pipe (not shown) which communicates with the interior of the tire. The filling and exhaust pipes pass through radial bores through the wall of the flange ring. Filling bores 20 are provided through the wall of the cylindrical sections 15 and filling bores 21 are provided through the wall of one of the conical sections.

The sleeve 14 is divided along a diametrical plane and bolting flanges 22 are welded along the edges of each half of the sleeve.

The joint is assembled as follows. The two halves of the sleeve 14 are placed around the damaged part of the structural member with a compression gasket between each pair of flanges 22 and the flanges 22 are bolted together using hydraulic bolts 28 such as are described in our U.S. Pat. No. 991,783. The hydraulic bolts are simultaneously tensioned using a common pressure source and an epoxy resin composition as the hydraulic fluid. The pressure used may be 25,000 psi and this pressure is maintained until the resin has set.

The spaces 23 between the cylindrical sections and the structural member and the space 24 between the conical sections and the structural member are then blown down with air through pipes connected to the filling bores 20 and 21 to eject the salt water. This is followed by an injection of fresh water into the spaces 23 and 24 and then a cleaning of the spaces 23 with alcohol. Finally the spaces 23 and 24 are blown down with air and the heating tapes are connected to a source of electricity to leave the spaces clean and dry.

The sealing tires 19 are then pressurised with water through the filling pipes to provide temporary seals between the tubular member and the sleeve. The spaces 23 are brought to a test pressure with compressed air and then the pressures in the spaces 23 and 24 are monitored to see if there are leaks in the seals. If there are no leaks the water is blown out of the seals through the exhaust pipe with compressed air applied through the filling pipe after which the tires are filled with an epoxy resin composition (Araldite SW404) and maintained at a pressure of about 80% of the yield strength of the pipe until set.

The spaces 23 are then filled with the epoxy resin composition to a pressure of about 60% the yield strength of the structural member or some other appropriate value. The electrical heating tapes are connected to a source of electricity and the current loading noted. The heating of the tapes accelerates the curing of the epoxy resin composition. After about an hour, when the current drops indicating that resin has set, the current is switched off.

Finally the space 24 is filled with a mixture of Portland cement and sharp sand.

An example of the invention as used to join together structural members will now be described.

FIG. 3 shows an offshore structure comprising a tower 111 standing in water 112 with its feet on the sea bed 113 and supporting the framework of an oil-drilling platform 114 above the surface 115 of the water. The tower 111 comprises four tubular corner legs 116 which are continuous from top to bottom and are cross-braced with horizontal tubular cross-bracing members 117 and diagonal tubular cross-bracing members 118. The nodal joints 119 between the cross bracing members 117 and 118 and the legs 116 are shown in detail in FIGS. 4 and 5.

The joint 119 comprises a ductile cast iron sleeve 120 that is split longitudinally. The two parts of the sleeve 120 are secured together around the tubular leg 116 by means of self straining bolts 121 such as are described in U.K. Pat. No. 1,382,192, which pass through flanges 122 along the longitudinal edges of one part of the sleeve and are secured in flanges 123 on the longitudinal edges of the other part. The use of self-straining bolts enables precisely-controlled bolting loads in the axial and radial directions to be achieved.

The sleeves are temporarily located in place on the tubular legs during the construction of the tower by tapered dowel pins 124 which are inserted into appropriately placed holes in the sleeves 120 and the legs 116.

Cast on one part of the sleeves 120 are two sets of lugs 125 spaced at 90° about the axis of the sleeve 120. The lugs are spaced apart by vertical slots which receive corresponding lugs 126 on the ends of the cross-bracing member 117 and 118, so that when the joint is assembled and hinge pins 127 are inserted, the cross bracing members are hinged about a horizontal axis to the sleeve 120.

The ends 128 of the cross-bracing members 117 and 118 adjacent the sleeve 120 are flattened to increase the inertia of the member in a plane transverse to the hinge plane. The lugs 126 on the end of each cross-bracing members are formed as part of a steel casting 129 which is welded at 130 to the flattened end 128 of the cross-bracing members and stress-relieved in the factory before the structure is assembled.

The hinge pins 127 comprise self straining tapered pins with a 1/40 taper. Holes 131 are drilled in the interleaving lugs of the sleeves and cross-bracing members and reamed to a corresponding 1/40 taper. The pins 127 are inserted in the bores in the stressed condition and subsequently the stress is relieved so that the pin expands to provide a firm connection between the sleeve and the cross-bracing members.

Before each sleeve is located in position on the legs 116, the inner surface of the sleeve and the site on the legs where the sleeve will lie are both roughened, for example, by using a rotary chipping hammer. The sleeve is then located in position with the dowel pins 124.

The sleeve has on its inner side near each end an annular groove 132 which accommodates a hollow annular sealing tire 133. The interior of the tire communicates with the outside of the sleeve through filling and exhaust stem pipes 134 which pass through bores in the wall of the sleeve.

When the sleeve is in position, the tires are inflated with hydraulic fluid or an epoxy resin composition to a suitable pressure applied through the filling pipe, air being bled off through the exhaust pipe until the tire is completely filled. The inflated tires seal the interface 135 between the sleeve and the leg 116. The interface is then washed down with carbontetrachloride (CTC) applied through radial bores 136 in the sleeve 120. Air is bled off through a radial bore 137 until the interface 135 is completely filled with CTC after which the pressure is raised to say 50 psi to test the seals. Once the seals have been found to be effective the CTC is drained out and the interface is filled with a high-strength high-friction epoxy resin composition, for example, a resin composition that is loaded with carborundum powder such as is sold as Araldite SW404, the air once again being allowed to bleed out through the bore 137 until the composition oozes out through it. The hole is then plugged and the pressure is raised to a suitable pressure at which pressure the composition is allowed to cure.

The strength of the joint thus made is many times the strength of the tubular leg.

Figure 6:
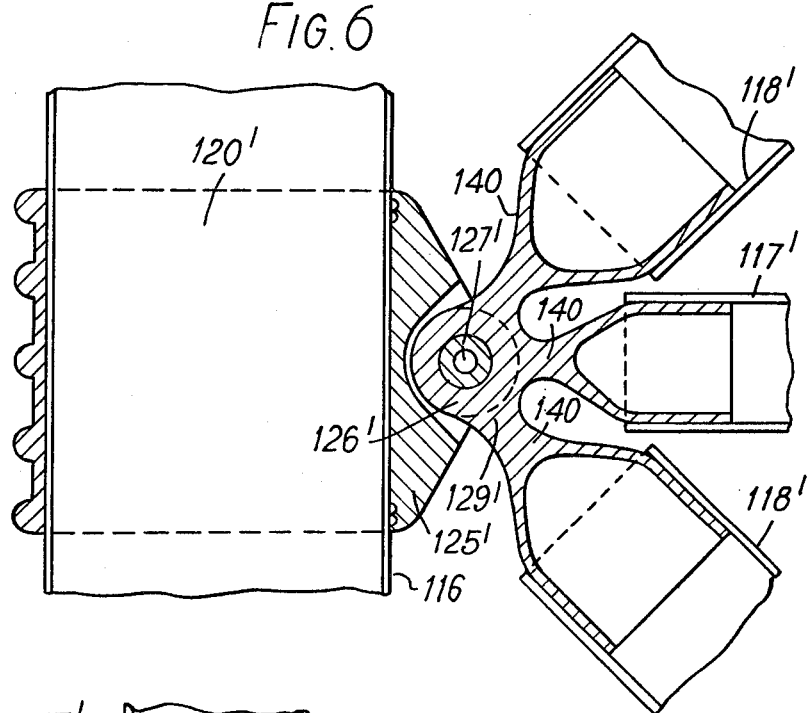
FIG. 6 shows a vertical section through an alternative form of joint which may be used constructing framework structures according to the invention.
Figure 7:
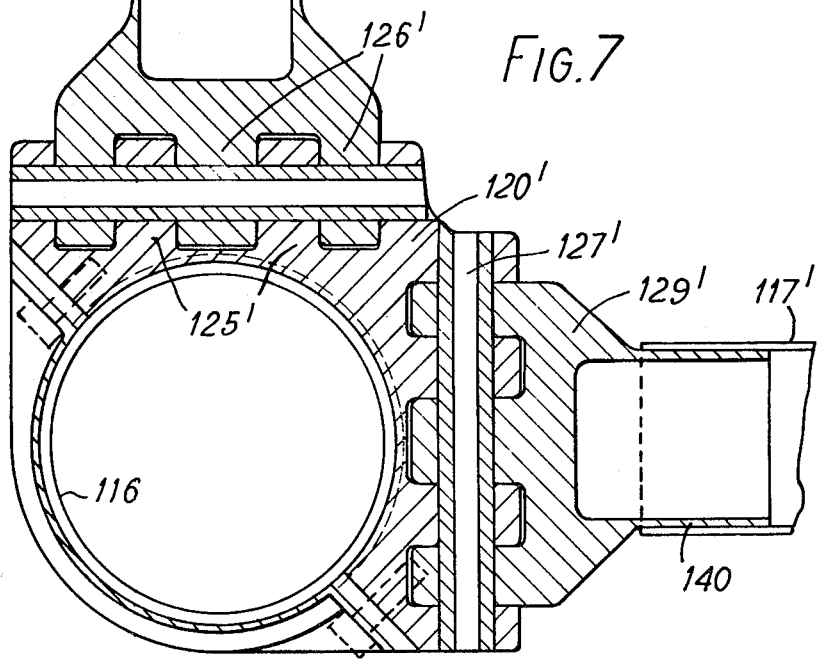
FIG. 7 shows a horizontal section through the joint of FIG. 6.

FIGS. 6 and 7 show an alternative form of coupling sleeve 120' which may be used for the nodal joints 119 of the tower of FIG. 3.

The sleeve 120' has two sets of lugs 125' spaced at 90° about the axis of the sleeve. Each set of lugs is connected by a hinge pin 127' to a single set of lugs 126' on a casting 129'. The casting has three tubular limbs 140 their axes inclined to one another in a common plane. The cross-braces 117' and 118' have plain tubular ends which can fit around the tubular limbs. The middle limb can be joined to the horizontal cross-brace 117' in the factory. The other cross-braces 118' may be joined to the outer limbs on site during erection of the structure. The joints between the limbs 140 and the cross-braces may be made using the method according to the present invention.

To facilitate erection of the structure each cross-bracing member 117 or 118 may be formed in two half-lengths with a sleeve spanning the division by about ½ tube diameter so that as each level of the tower is completed, the hinge pins inserted and the distances between the legs is set, the interfaces between sleeves of the cross-braces can be filled with epoxy composition according to the method of the invention.

Figure 8:
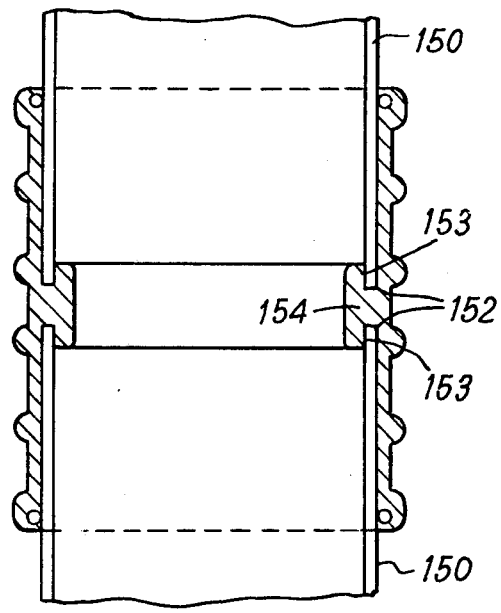
FIG. 8 shows a joint between two aligned tubular members which may be used in a modification of the tower of FIG. 3.

The legs of the structure may also be made in sections joined together by sleeves. FIG. 8 shows a vertical section through a part of a leg 116'. The leg is formed in tubular sections 150. The ends of the sections 150 fit in a tubular casting 151. The ends of the sections 150 are seated against rubber O rings 152 in grooves 153 on opposite sides of a central internal flange 154 on the casting 151. The interface between the sections 150 and the casting 151 are filled with resin composition again using the method of the invention.

Figure 9:
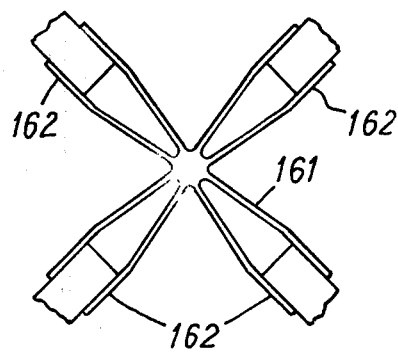
FIG. 9 shows a nodal joint between cross-bracing members.

Similarly the nodal joints 160 of the structure at the points where the cross-bracing members meet may be formed as shown in FIG. 9 by a star-shaped casting 161 with four tubular limbs 162. Each limb fits around the end of a diagonal cross-bracing member and may be secured to it when the members are aligned in their final positions, with an epoxy resin composition using the method according to the invention.

The method of the invention may be used for erecting other tubular framework structures such as for example road or rail bridges or for the framework of high-rise buildings. The method enables the structures to be erected in situ without the use of welding and without penetrating the tubular stressed member. The structure described above uses pin joints and thus avoids bending and racking stresses which would otherwise be induced in the structure. It thus promotes the most economic use of materials.

In order to reduce costs further and yet provide versitility in using the method for any large structure, a standard range of joint members may be mass produced and catalogued. Structures of various shapes and sizes can then be constructed using the joint members and lengths of standard size tubing.

I claim:

1. A method of repairing a damaged structural tubular member including the steps of providing a sleeve which is divided longitudinally and has cylindrical end portions and an enlarged central portion, placing the said divided sleeve around said structural tubular member with said enlarged portion around said damaged part, so that there is a space between each cylindrical end portion of the sleeve and the adjacent part of the tubular member, closing the ends of at least the said spaces between the cylindrical end portions and the tubular member, injecting a hardenable composition through the wall of the sleeve into the space between the closed ends, and maintaining the composition under pressure until set.

2. A method according to claim 1 in which the composition is a high friction epoxy resin composition.

3. A method according to claim 2 in which the epoxy resin composition includes carborundum powder.

4. A method according to claim 1 in which the two parts of the sleeve have bolting flanges along their longitudinal edges and including the step of securing the bolting flanges together with bolts.

5. A method according to claim 1 in which the space between the central portion and the tubular member is filled with a material of high crushing strength.

6. A method according to claim 5 in which the said material is cement.

* * * * *